United States Patent [19]
Konishi et al.

[11] Patent Number: 5,781,872
[45] Date of Patent: Jul. 14, 1998

[54] ON-VEHICLE DATA PROCESSING AND DISPLAY SYSTEM RESPONSIVE TO A VEHICLE MODE OF OPERATION

[75] Inventors: Masanori Konishi; Shinji Kubota, both of Suwa; Hisatomo Ohki; Kazuyuki Tomita, both of Atsugi, all of Japan

[73] Assignees: Seiko Epson Corporation, Tokyo; Unisia Jecs Corp., Atsugi, both of Japan

[21] Appl. No.: 448,447

[22] PCT Filed: Oct. 4, 1994

[86] PCT No.: PCT/JP94/01659

§ 371 Date: Jun. 2, 1995

§ 102(e) Date: Jun. 2, 1995

[87] PCT Pub. No.: WO95/10026

PCT Pub. Date: Apr. 13, 1995

[30] Foreign Application Priority Data

Oct. 4, 1993 [JP] Japan ................................. 5-273194

[51] Int. Cl.$^6$ .................................................. B60Q 9/00
[52] U.S. Cl. ............................ 701/36; 340/438; 340/459
[58] Field of Search .......................... 364/424.03, 424.04, 364/550, 551.01, 423.098, 424.034; 340/438, 458, 459, 461, 462; 701/1, 26, 36

[56] References Cited

U.S. PATENT DOCUMENTS

| 4,196,413 | 4/1980 | Sowa .............................. 340/462 |
| 4,398,258 | 8/1983 | Naitoh et al. .................. 364/424.03 |
| 4,521,885 | 6/1985 | Melocik et al. ............. 364/424.03 X |
| 4,551,801 | 11/1985 | Sokol ............................ 364/424.03 |
| 4,906,970 | 3/1990 | Momura ..................... 364/424.03 X |
| 4,924,418 | 5/1990 | Bachman et al. ............... 364/550 |
| 5,267,159 | 11/1993 | O'Neall ....................... 364/424.04 |
| 5,309,139 | 5/1994 | Austin ........................... 340/462 |
| 5,450,321 | 9/1995 | Crane ........................... 364/424.04 |

FOREIGN PATENT DOCUMENTS

| A-0 122 043 | 10/1984 | European Pat. Off. . |
| A-0 414 402 | 2/1991 | European Pat. Off. . |
| A-2 601 130 | 1/1988 | France . |
| A-58-52565 | 3/1983 | Japan . |
| 59-45233 | 3/1984 | Japan . |
| A-59-45233 | 3/1984 | Japan . |
| 59-229699 | 12/1984 | Japan . |
| A-59-229699 | 12/1984 | Japan . |
| U-61-3045 | 1/1986 | Japan . |
| A-61-150874 | 7/1986 | Japan . |
| A-62-59812 | 3/1987 | Japan . |
| 62-282225 | 12/1987 | Japan . |
| A-62-282225 | 12/1987 | Japan . |
| 4-273016 | 9/1992 | Japan . |
| A-4-273016 | 9/1992 | Japan . |

OTHER PUBLICATIONS

P. Andreas et al., "The Driver Information Systems of the Volkswagen Research Car Auto 2000," IEEE Transactions on Industrial Electronics, vol. ie–30, No. 2, May 1983, New York, pp. 132–137; p. 136, Right col., paragraph 6; Figs. 9–11.

Patent Abstracts of Japan, vol. 009, No. 334 (P–417), Dec. 1985 & JP-A-60 158315, Aug. 1985.

Patent Abstracts of Japan, vol. 010, No. 030 (P–426), Feb. 1986 & JP-A-60 179608, Sep. 1985.

*Primary Examiner*—Michael Zanelli
*Assistant Examiner*—Edward Pipala
*Attorney, Agent, or Firm*—Oliff & Berridge, PLC

[57] ABSTRACT

An on-vehicle data processing system is provided which can cause the vehicle information to be displayed on a display device 10. The on-vehicle data processing system has a mode setting unit 32 for setting the running and stop modes and a data processing unit 34 for computing the mode images. The data processing unit 34 computes the running mode images representing the running states of the vehicle in real time while in the running mode and the stop mode images representing the details of the vehicle information while in the stop mode. Thus, the running mode images, more easily viewed by the driver, can be displayed on the display device in the running mode while the stop mode images, preferentially displaying the contents of the vehicle information, can be displayed on the display device in the stop mode.

16 Claims, 24 Drawing Sheets

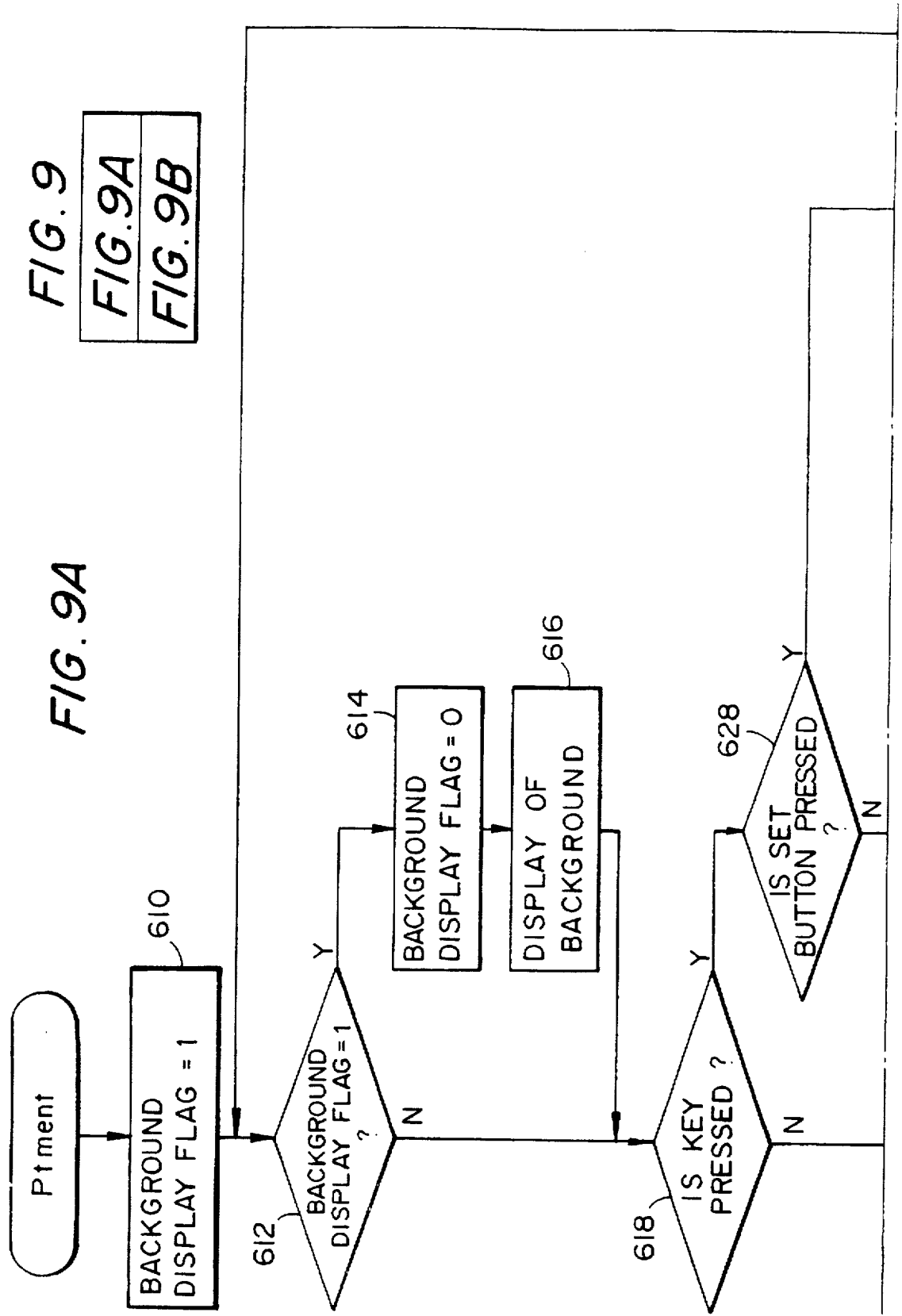

FIG. 20

| | COVERED DISTANCE | TIME | SPEED | FUEL CONSUMPTION |
|---|---|---|---|---|
| | Km | H M | Km/h | Km/l |
| 1 | 0000.0 | 00 00 H M | 000 | 00.0 |
| 2 | 0000.0 | 00 00 H M | 000 | 00.0 |
| 3 | 0000.0 | 00 00 H M | 000 | 00.0 |

HORSEPOWER    RECORD

ON-VEHICLE DATA PROCESSING AND DISPLAY SYSTEM RESPONSIVE TO A VEHICLE MODE OF OPERATION

BACKGROUND OF THE INVENTION

1. Field of the Invention

The present invention relates to an on-vehicle data processing system and particularly to such a system which can indicate the running and stop mode images on an on-vehicle display.

2. Prior Art

At present, display devices such as TV and other monitors are frequently mounted on vehicles. It is expected that on-vehicle display devices increasingly spread since their size and manufacturing cost will be reduced with advancement of the technology.

However, the on-vehicle display devices of the prior art were only used to indicate the present position of a vehicle through a navigation system or to display television scenes through a TV receiver. They were rarely used in the other applications.

With the navigation system, the on-vehicle display devices will not frequently be used as the vehicles are daily running. Television scenes will not be viewed by the drivers as the vehicles are running. In practice, therefore, the on-vehicle display devices were rarely used.

SUMMARY OF THE INVENTION

In view of the problems in the prior art, an object of the present invention is to provide an on-vehicle data processing system which displays data on a vehicle on an on-vehicle display device. The data to be displayed when the vehicle is running are different from the data to be displayed when the vehicle is not running, so that the on-vehicle display device can be effectively used.

To this end, the present invention provides a on-vehicle data processing system comprising mode setting means responsive to the present speed of a vehicle for selecting and setting one of running and stop modes and display data processing means for computing running mode images indicating running states of the vehicle when the running mode is selected and set and for computing stop mode images indicating detailed various vehicle information when the stop mode is selected and set, thereby causing the running or stop mode images to be displayed on an on-vehicle display device.

Thus, the on-vehicle data processing system of the present invention can be responsive to the present speed of the vehicle for selecting and setting one of the running and stop modes. In the running mode, the running mode images indicating running states of the vehicle are computed and displayed on the on-vehicle display device. In the stop mode, the stop mode images indicating detailed vehicle information are computed and displayed on the on-vehicle display device.

In such a manner, the on-vehicle data processing system of the present invention can preferentially cause the running mode images more easily viewed by the driver to display on the on-vehicle display device when the vehicle running mode is selected and set and can preferentially cause the stop mode images to indicate the contents of the information to display on the on-vehicle display device when the stop mode is selected and set. Thus, the driver can obtain various vehicle information from the on-vehicle display device.

In one preferred embodiment of the present invention, the on-vehicle data processing system may comprise control means for selecting any one of items for the running or stop modes, wherein the display data processing means computes the running or stop mode images representing a selected item.

Thus, the control means can be used to select any one of the items for the running and stop modes. For example, the items indicating the running states of the vehicle include speed, fuel consumption, torque, acceleration and others. Any one of these running mode items can be selected and displayed on the on-vehicle display device in real time. When the item of torque is selected, for example, variations in torque can be indicated on the on-vehicle display device in real time.

The details of the vehicle information may include various items indicating vehicle maintenance information, travel information and others. Any one of these items can similarly be selected and indicated on the on-vehicle display device.

Thus, the driver can select any necessary item from various items and cause it to display on the on-vehicle display device.

In another preferred embodiment of the present invention, the on-vehicle data processing system may comprise memory means for storing history of data of an item selected for the running mode image as a data history, the control means being capable of selecting the data history as an item for the stop mode image, the display data processing means being operative to read the data history from said memory means and to compute the stop mode images for a graphical display when the data history item is selected in the stop mode, to indicate variations of the data.

In such a manner, the on-vehicle data processing system of the present invention is adapted to store history of data displayed as running mode images in real time as a data history and to graphically display the data history on the on-vehicle display device as a stop mode image when the stop mode is selected and set.

For example, when the fuel consumption item is to be indicated, the present fuel consumption can be indicated in real time when the running mode is selected and set while variations in the fuel consumption on vehicle running can be graphically indicated in the stop mode. Thus, the driver can analyze his or her own driving technique relating to the fuel consumption.

It is further preferred that the control means is operative to set a warning value relating to at least one of the running and stop mode images, the display data processing means being operative to output a warning signal when a level of the selected item set by the warning value reaches that warning level.

Thus, the driver can be warned when the level of the selected item reaches the set warning level. For example, with the fuel consumption, the driver can be warned with respect to a rapidly degraded consumption due to over-acceleration or the like if the lower limit of the fuel consumption has been set.

It is still further preferred that the mode setting means is operative to set a first reference speed at which the running mode is switched to the stop mode to be lower than a second reference speed at which the stop mode is switched to the running mode.

This can cause the reference speeds for switching between the running and stop modes to have a hysteresis characteristic. When the vehicle is repeatedly started and stopped as in a traffic jam, the display images can be prevented from frequently being switched from one mode to another mode, resulting in stable images on the on-vehicle display device.

It is further preferred that the display data processing means is operative to display larger characters in the running mode images and smaller characters in the stop mode images.

Thus, the characters such as letters and the like can be displayed larger in the running mode images and smaller in the stop mode images. The running mode images can be more easily viewed by the driver while being displayed in real time. In the stop mode images, the details of the vehicle information can be preferentially displayed to indicate their contents.

It is further preferred that the display data processing means is operative to compute the images for daytime with the foreground being brighter than the background and to compute images for night with the foreground being darker than the background.

When the relative brightness of the foreground and background is thus reversed between the daytime and night images, the images may be better viewed both in the daytime and night.

BRIEF DESCRIPTION OF THE DRAWINGS

FIG. 20 is a view illustrating "record" display in a stop mode.

DETAILED DESCRIPTION OF PREFERRED EMBODIMENT

The present invention will now be described by way of example with reference to the drawings.

Figure 1:
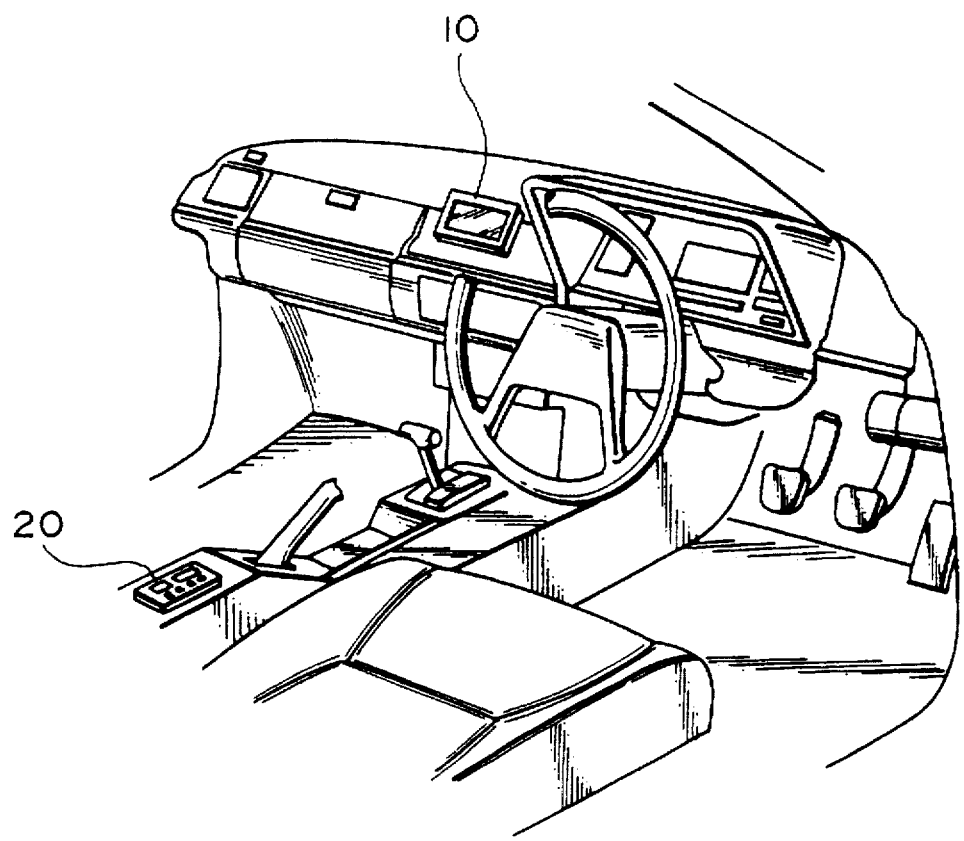
FIG. 1 is a view illustrating part of interior of a vehicle in which an on-vehicle data processing system and display device according to one embodiment of the present invention are mounted.

FIG. 1 schematically shows the inside of a vehicle around the driver's seat in which an on-vehicle data processing system and display device according to this embodiment are mounted.

An on-vehicle display device 10 is fixedly mounted on a position that can be viewed by the driver while in his or her seat. The on-vehicle display device 10 can be controlled relating to its display states through a remote control unit 20.

The on-vehicle display device 10 may be any one of commercially available television (TV) displays, navigation system displays and other displays made exclusively for the present invention. In this embodiment, a commercially available TV display device is used.

Figure 2:
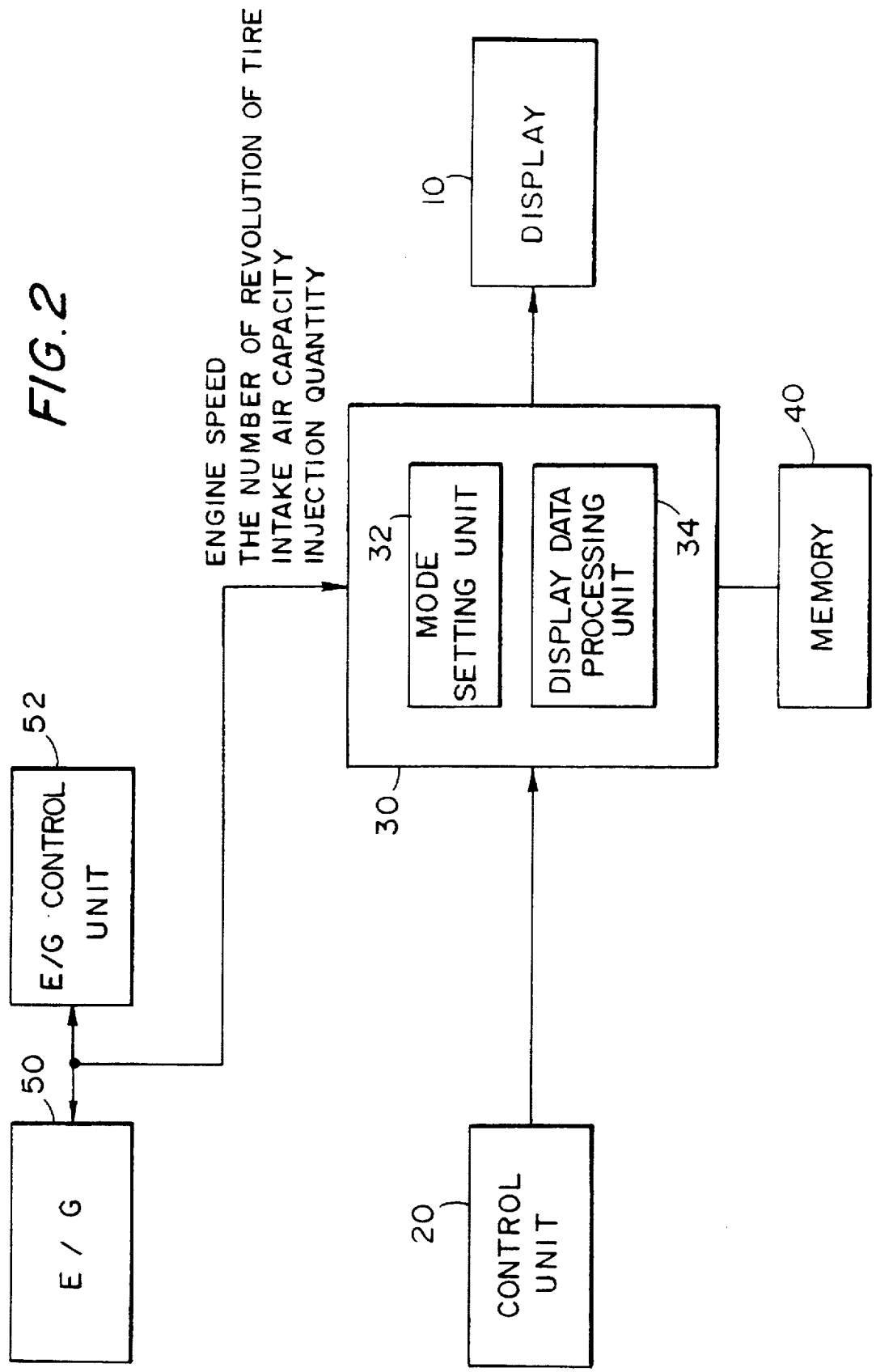
FIG. 2 is a block diagram illustrating the system of the embodiment.

FIG. 2 shows a block diagram of a on-vehicle data processing system in this embodiment.

The on-vehicle data processing system comprises a running data processing circuit 30 and a memory 40.

The running data processing circuit 30 receives control signals from the remote control unit 20 and also other signals from various parts of the vehicle. In this embodiment, the vehicle has an engine 50 electronically controlled by an engine control unit 52. The engine control unit 52 provides, to the running data processing circuit 30, pulse signals representing engine speed, pulse signals representing the number of revolution of the tire, voltage signals representing a capacity of air intake of the engine, pulse signals representing injection quantity and other pulse signals.

The running data processing circuit 30 comprises a mode setting unit 32 and a display data processing unit 34.

The mode setting unit 32 determines the speed of the vehicle from the input signals and uses the determined speed to set one of running and stop modes. In this embodiment, a first reference speed at which the running mode is switched to the stop mode is set to be lower than a second reference speed at which the stop mode is switched to the running mode.

The display data processing unit 34 is responsive to the input signals for computing various running data in the vehicle. In the running mode, the display data processing unit 34 displays the running states of the vehicle in real time on the display device 10.

The memory 40 stores the signals input to the running data processing circuit 30 and the running data computed by the running data processing circuit 30 in the running mode, if necessary.

In the stop mode, the display data processing unit 34 reads data from the memory 40, computes details of the vehicle information and displays the details of the data on the display device 10.

In this embodiment, the mode setting unit 32 provides a hysteresis characteristic to the reference speeds used to switch between the stop and running modes. When the vehicle is repeatedly stopped and started as in a traffic jam, the displayed images can be prevented from frequently being switched from one to another. Thus, stable images are provided on the on-vehicle display device.

Figure 10A:
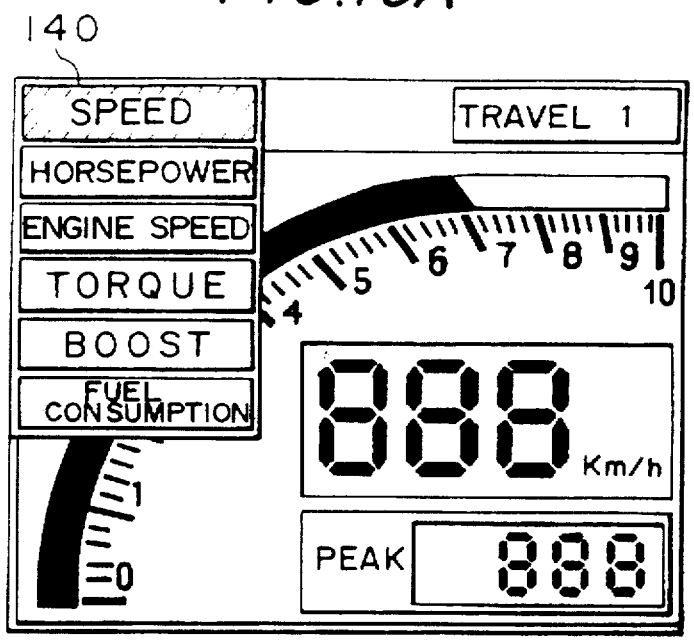
FIGS. 10(A) and 10(B) illustrate examples of menu images.

In this embodiment, items to be displayed in the running mode include speed, power, tacho (engine speed), torque, boost and eco (fuel consumption), as shown in FIG. 10(A). Any of these items can be selected by the driver. FIGS. 11 to 16 illustrate the displayed images in the running mode representing these items.

Figure 10B:
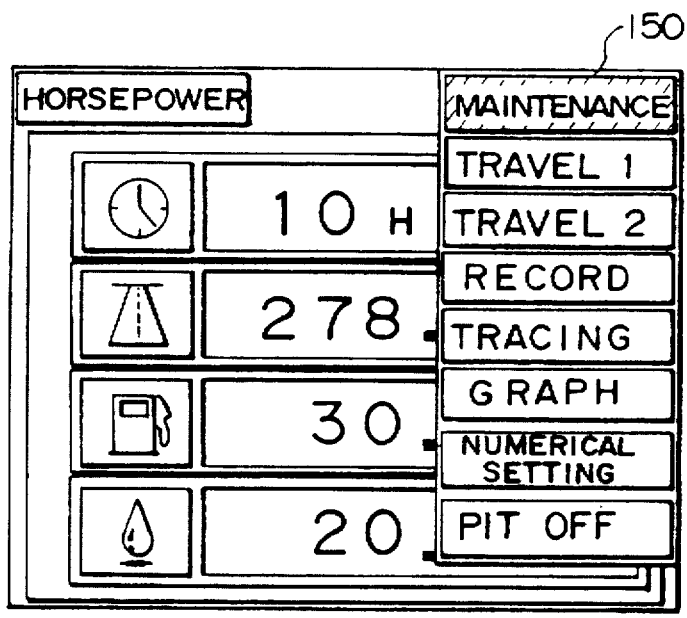
Figure 17A:
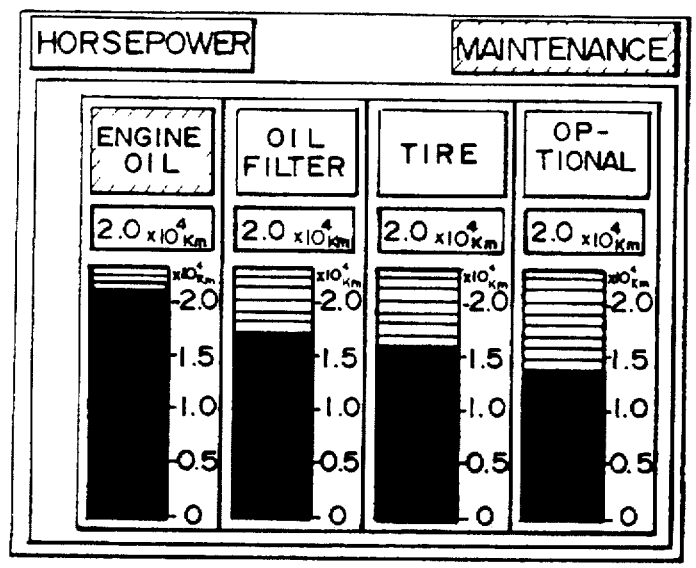
FIGS. 17(A) and 17(B) illustrate "mainte" display in a running and stop mode.

In this embodiment, selectable items to be displayed in the stop mode include "mainte", "trip", "travel", "record", "trace", "graph", "set up" and "pit off", as shown in FIG. 10(B). FIGS. 17A and B, 18, 19A and B, 20, 21A and B, 22, and 25A and B show the displayed images in the stop mode representing the above items. The "pit off" is used to instruct the continuous display of the running mode images even in the stop mode.

The top left corner of each of the running mode images shown in FIGS. 11 to 16 indicates an item selected and displayed in the running mode while the top right corner represents an item selected in the stop mode. Similarly, the top right corner of each of the stop mode images shown in FIGS. 17A and B, 18, 19A and B, 20, 21A and B, 22, and 25A and B indicates an item selected and displayed in the stop mode while the top left corner represents a selected item in the running mode. Thus, the driver can know which items are displayed in the stop and running mode images.

In this embodiment, the display data processing unit 34 indicates larger characters in the running mode and smaller characters in the stop mode. Thus, the driver can more easily view the running mode images indicating the vehicle running states in real time. In the stop mode, the details of the vehicle information can be displayed with full consideration given to their contents.

The display data processing unit 34 also functions to display the foreground and background reversed in brightness for daytime or night. Both in the daytime and night, the images can be more clearly viewed by the driver.

Figure 26A:
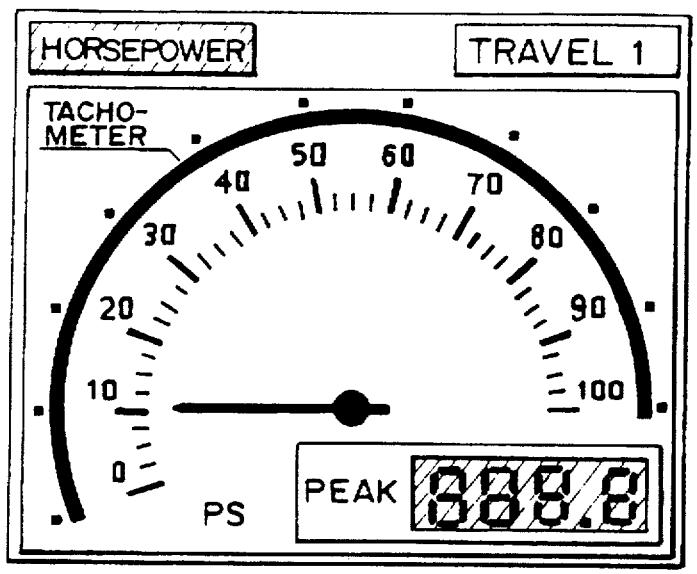
FIGS. 26(A) and 26(B) respectively show the images for daytime and night with brightness of the foreground and the backgrounds being correspondingly reversed.
Figure 26B:
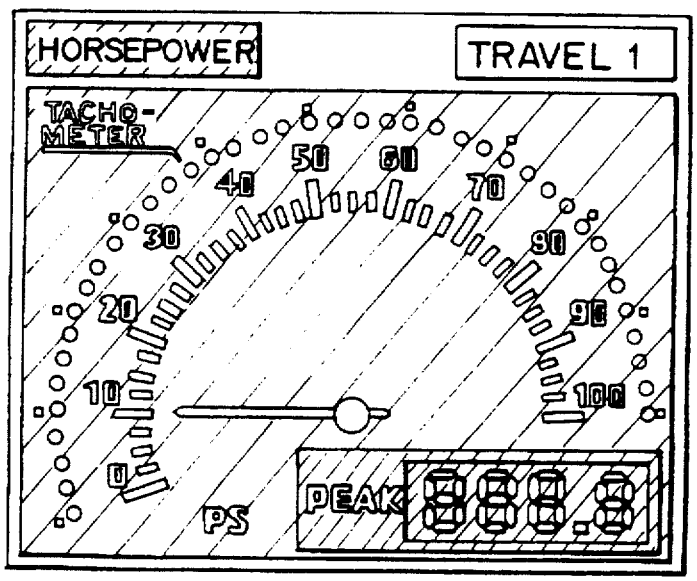

FIGS. 26A and B show an example of the image switched in brightness for daytime or night. As an illumination key 29 in the remote control unit 20 is operated, the daytime image shown in FIG. 26(A) can be switched to the night image shown in FIG. 26(B) or vice versa. It is selected herein that the frequently changing parts such as letters, indicators and others are in foreground while the other parts are in background. In the daytime image, the background and foreground are white and black, respectively. In the night image, the white and black are reversed from the daytime image.

To increase viewability, the brightness of the foreground can be fixed while the brightness of the background can be regulated.

The structure of the on-vehicle data processing system according to this embodiment will be described in more detail.

Figure 3:
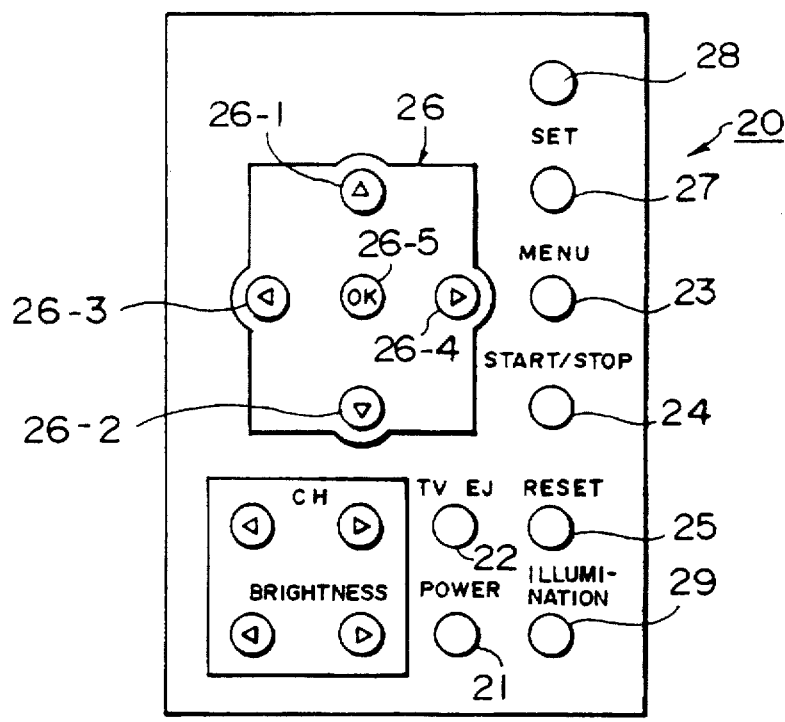
FIG. 3 is a view illustrating a control unit.

FIG. 3 shows the details of the remote control unit 20 used in this embodiment. The remote control unit 20 comprises a power key 21, a change key 22 for switching TV display to the system of this embodiment or vice versa, a menu key 23, a start/stop key 24, a reset key 25, an item selection key 26 including function keys 26-1, 26-2 . . . 26-5 and other keys 27, 28 and 29.

When the power key 21 is turned on and if the change key 22 is operated to select TV display, TV images received by a TV receiver (not shown) are displayed on the display device 10. When the change key 22 is operated to select the system of this embodiment, vehicle data output from the system of this embodiment will be displayed on the display device 10.

Figure 4:
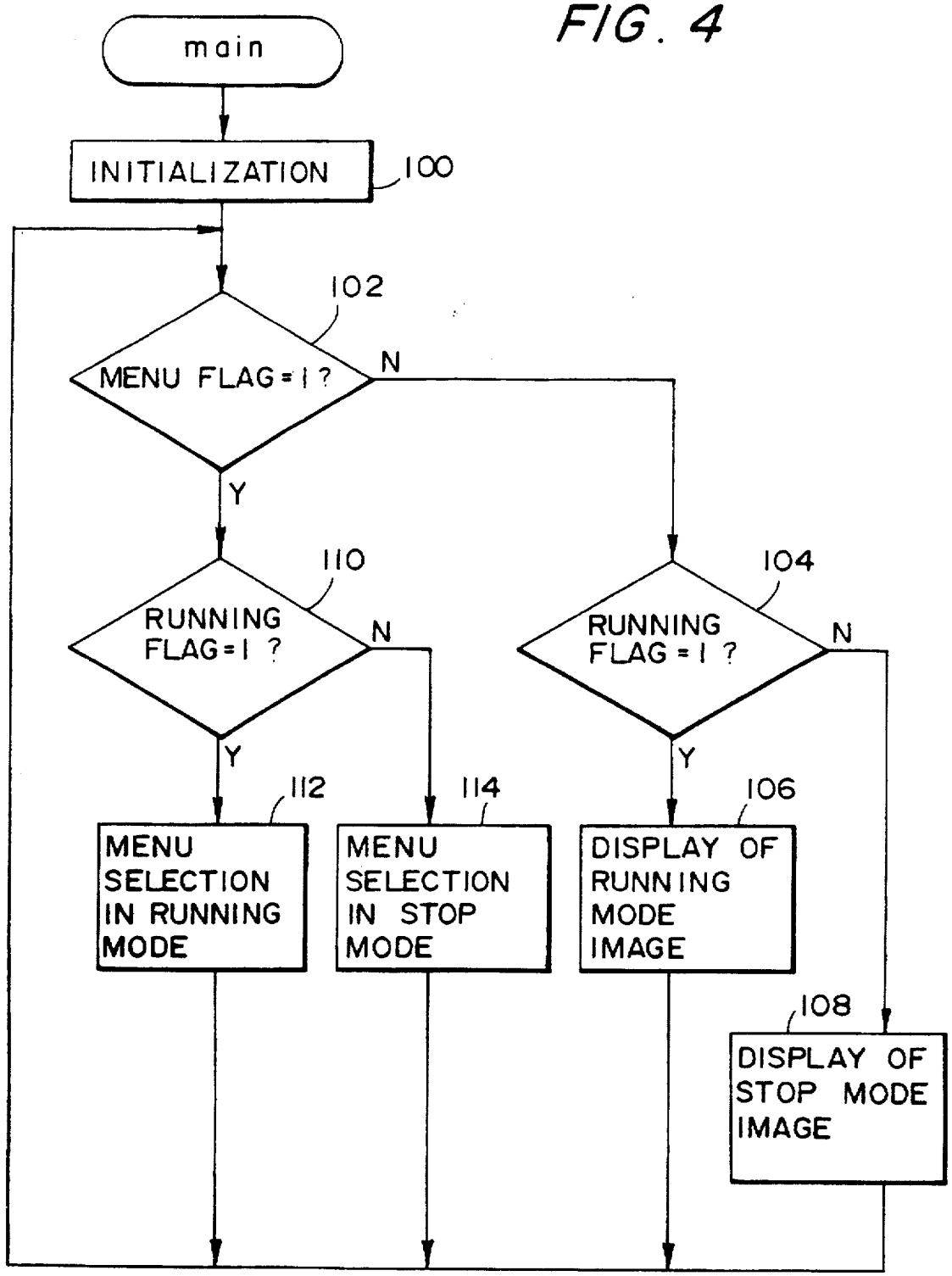
FIG. 4 is a flow chart illustrating the basic operation of the system according to the embodiment of the present invention.

FIG. 4 shows a flow chart representing the basic operation of the system according to this embodiment.

As the power key 21 shown in FIG. 3 is first turned on and when the change key 22 is operated to select the system of this embodiment, a predetermined initialization is executed at step 100. At step 102, it is determined whether a menu flag is 1 or 0. The menu flag is set "1" when the menu image shown in FIG. 10 is called to select any item.

Since the menu flag is normally set at "0" on start of the system, the program proceeds to step 104. At step 104, it is determined whether the vehicle is in running or stop mode. In the running mode, a running flag is set "1". In the stop mode, the running flag is set "0".

If it is determined that the vehicle is in the running mode, a running mode image representing the item currently selected is displayed on the display device 10 (step 106).

If the vehicle is in the stop mode, a stop mode image representing the item currently selected is displayed on the display device 10 (step 108).

If the driver wants to change the item displayed in the running or stop mode, the menu button 23 of the remote control unit 20 is operated. The menu flag is set "1". The program proceeds from the step 102 to step 110 at which it is determined whether the vehicle is in the running or stop mode. If it is determined that the vehicle is in the running mode (running flag=1), a menu image as shown in FIG. 10(A) is displayed at step 112. If the vehicle is in the stop mode (running flag=0), a menu image as shown in FIG. 10(B) is displayed at step 114. More particularly, if it is determined that the vehicle is in the running mode, a window is opened over the running mode image currently being displayed to indicate the menu image 140 of FIG. 10(A). If it is determined that the vehicle is in the stop mode, another window is opened over the stop mode image currently being displayed to indicate the menu image 150 of FIG. 10(B).

Figure 5:
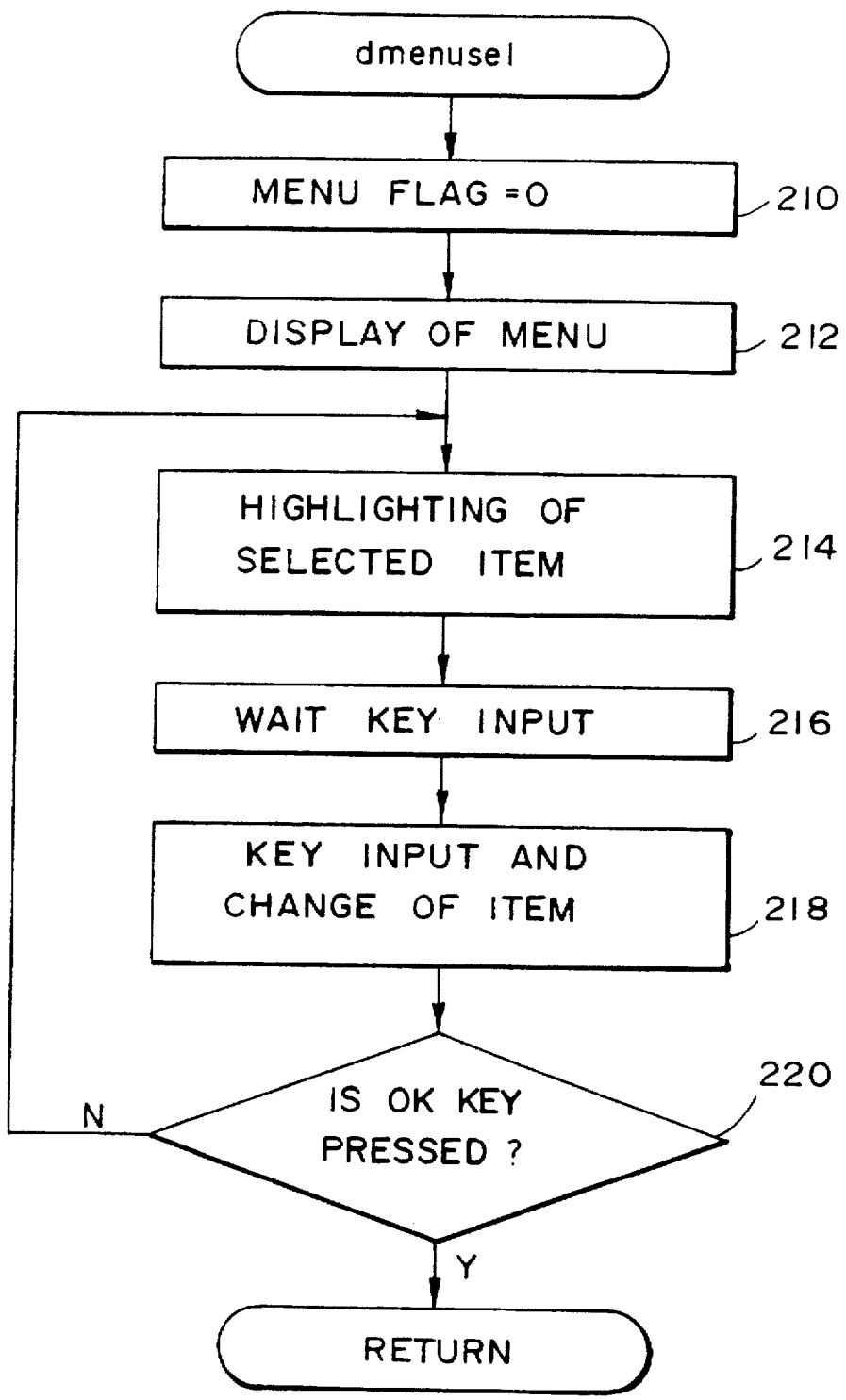
FIG. 5 is a flow chart illustrating the menu selection.

FIG. 5 shows a flow chart illustrating the menu selection.

As the menu selection is first initiated, the menu flag is set "0" at step 210. At step 212, a menu image as shown in FIG. 10(A) or 10(B) is displayed. The item currently selected is highlighted to be brighter than the other items (step 214).

As the menu button 23 of the remote control unit 20 is pressed, all items are highlighted one by one from the top to the bottom of the menu image of FIG. 10. Thus, any item can be selected (steps 216 and 218).

When a desired item is highlighted and the OK key 26-5 in the remote control unit 20 is operated, the menu selection process is completed (step 220). Then, the running or stop mode image representing that newly selected item will be displayed.

If any one of the items "speed". . . "eco" is selected from the menu image of FIG. 10(A) in the running mode, a corresponding drive (DR) mode flag is set at any of "0"–"5", respectively. Similarly, if any one of the items "mainte" ... "pit off" from the menu image of FIG. 10(B) in the stop mode, a corresponding pit (PT) mode flag is set at any of "0"–"7", respectively.

Figure 6:
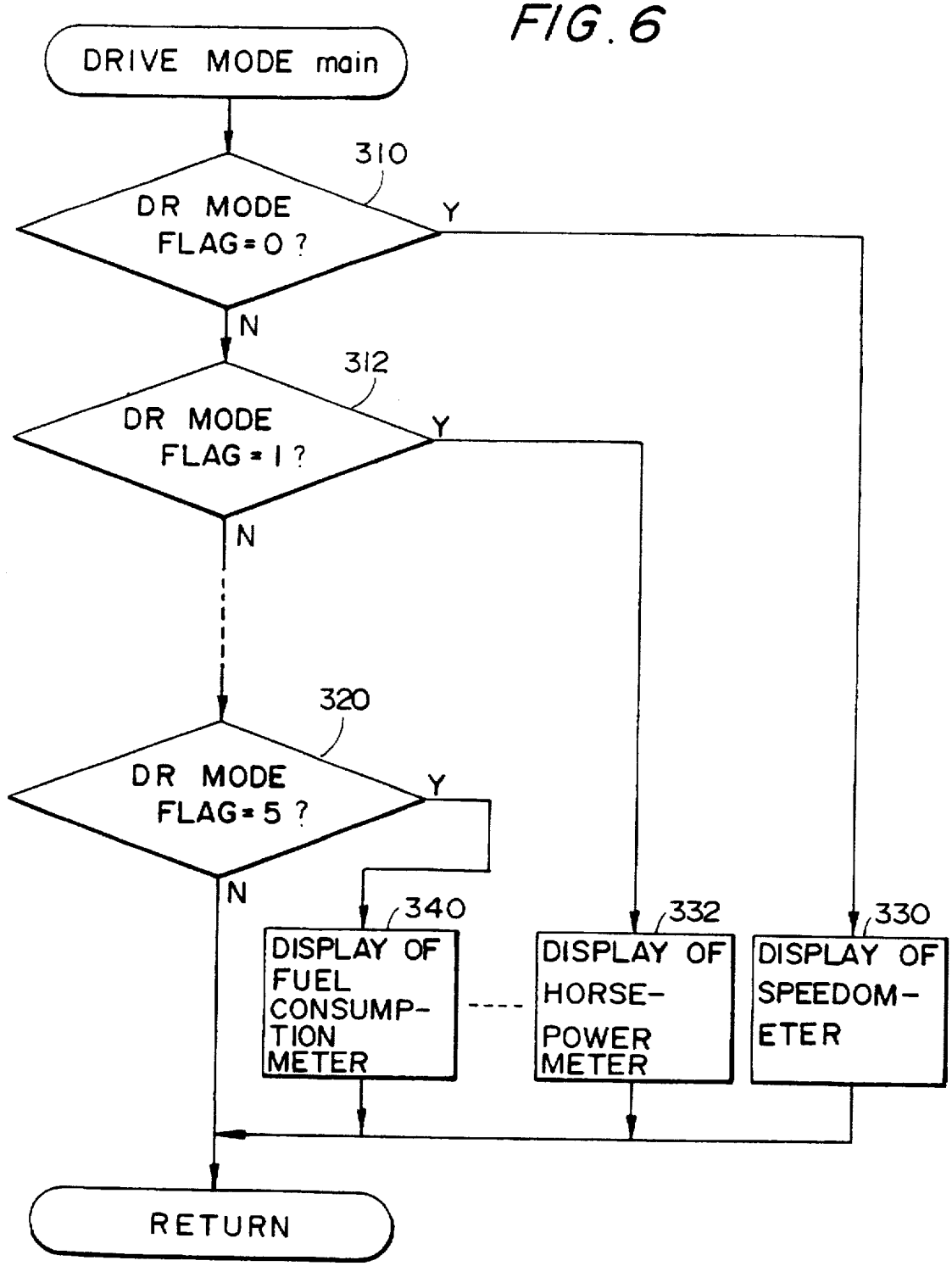
FIG. 6 is a flow chart illustrating the running mode image display.

FIG. 6 illustrates the flow chart of the running mode image display representing the item selected at step 106 in FIG. 4.

In this operation, the display item (drive mode flag) selected by the running mode menu selection (step 112) is identified at steps 310–320 for drive mode flags 0,1 ... 5, respectively. The running mode image of this display item is displayed at steps 330–340, respectively.

Figure 11:
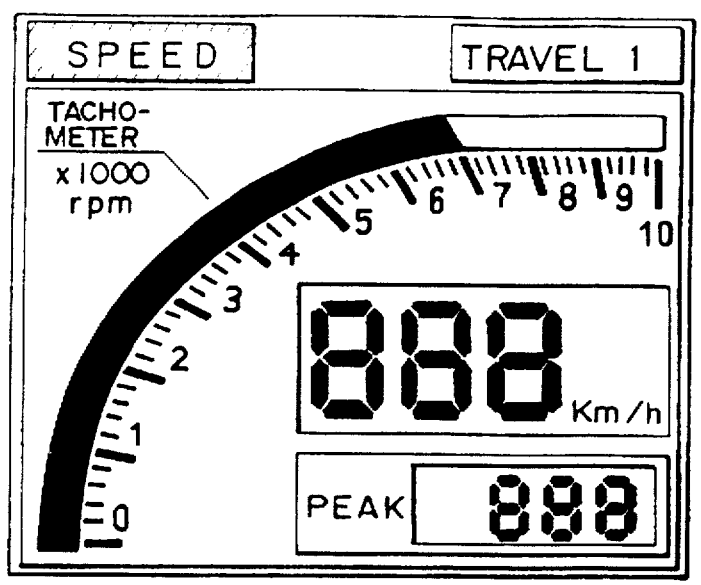
FIG. 11 is a view illustrating a speedometer image in a running mode.
Figure 12:
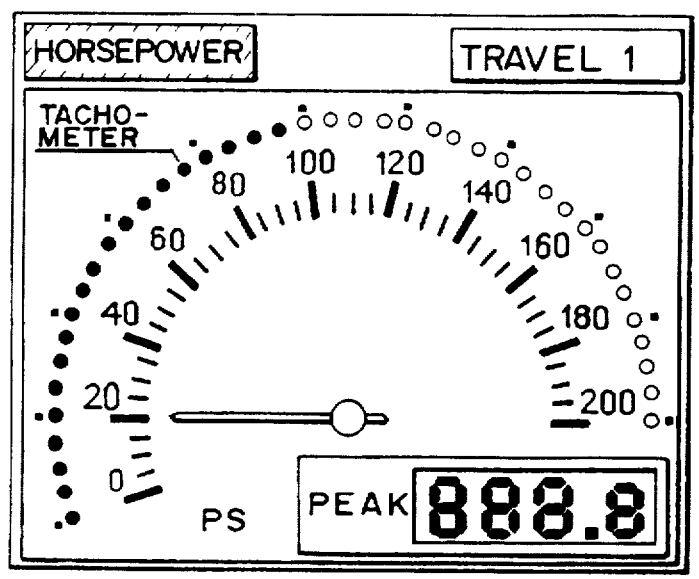
FIG. 12 is a view illustrating a power meter image in a running mode.
Figure 13:
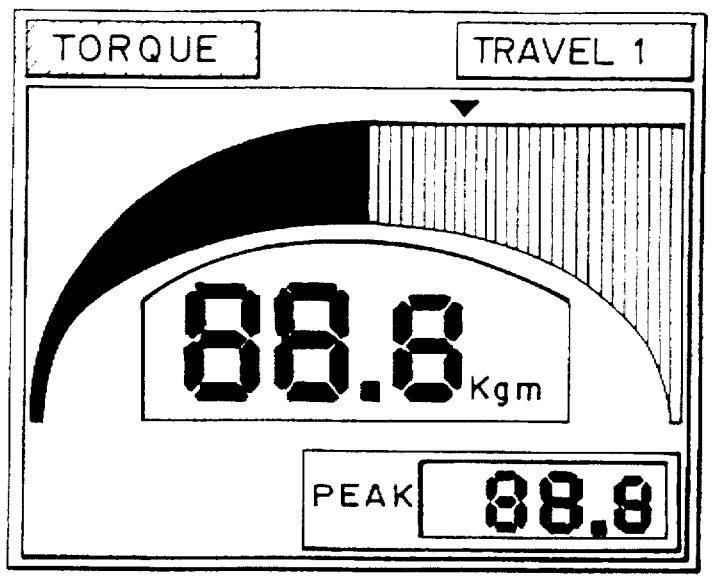
FIG. 13 is a view illustrating a torque meter image in a running mode.
Figure 14:
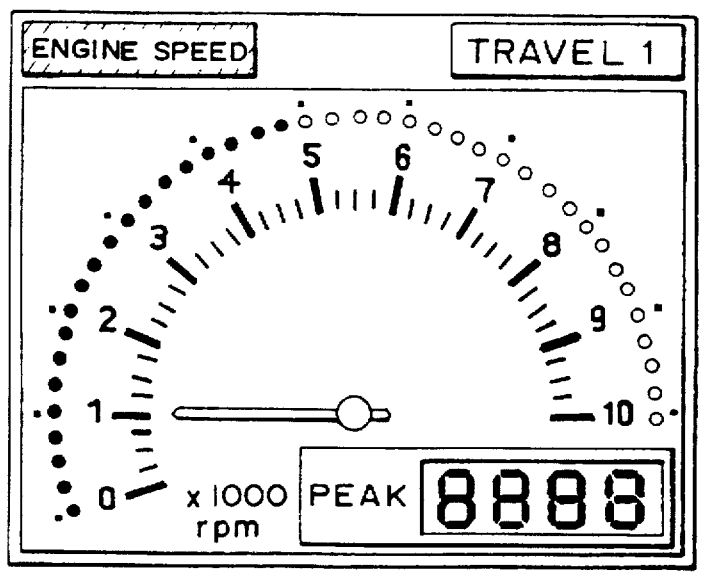
FIG. 14 is a view illustrating a tachometer image in a running mode.
Figure 15:
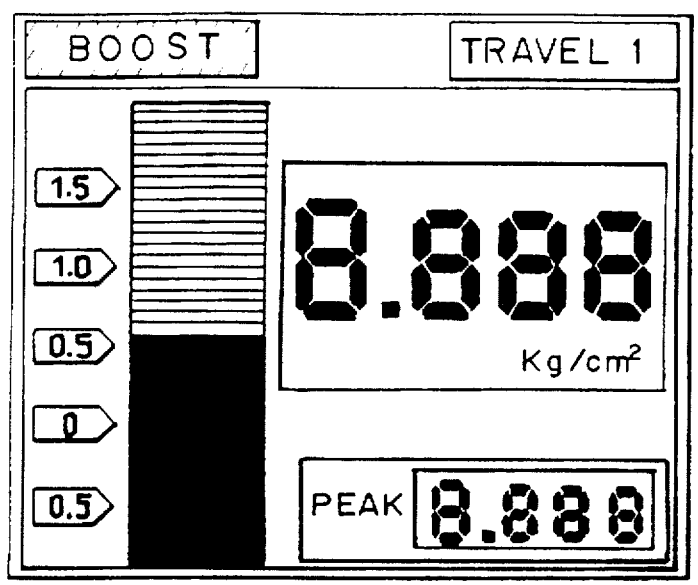
FIG. 15 is a view illustrating a boost meter image in a running mode.
Figure 16:
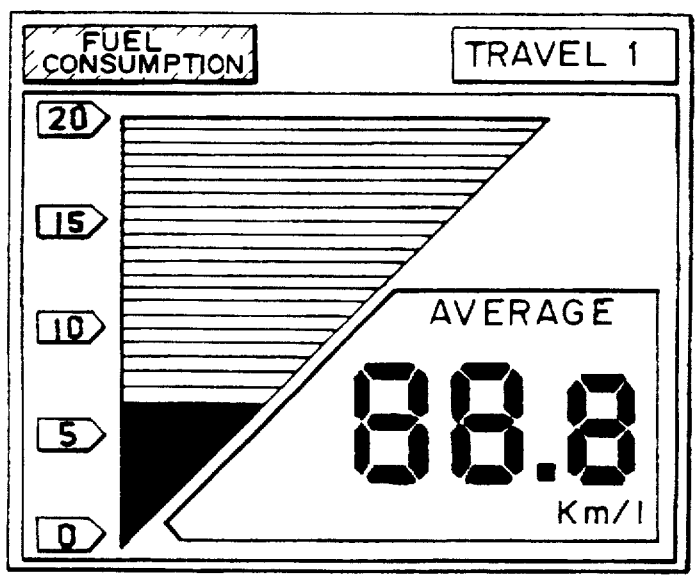
FIG. 16 is a view illustrating an eco meter image in a running mode.

For example, if the item "speed" is selected as display item (drive mode flag=0) from the menu image, the vehicle speed is computed in real time and displayed on the display device as shown in FIG. 11. The peak speed which has been stored in memory 40 is also displayed simultaneously. In this embodiment, a speed limit may previously be set as a warning value, as will be described later. Each time when the speed of the vehicle reaches the warning value, the driver will be warned by blinks of the image or the like. This may prevent the vehicle from being driven on streets greater than the speed limit.

In the system of this embodiment, the running data processing circuit 30 can be responsive to input data for computing the vehicle power, engine speed, torque boost, fuel consumption and other factors substantially in real time, these computed factors being displayed on the display device 10 as shown in FIGS. 12–16 (steps 330–340). Thus, the driver can obtain data which would not be obtained from the on-vehicle meters substantially in real time from the display device 10. For example, if the fuel consumption is degraded, the acceleration pedal can be pressed in a manner to save the fuel consumption.

When the running mode images of the respective items are to be displayed as shown in FIG. 6, the system of this embodiment writes the data of the displayed items sequentially into the memory 40 as a data history. For example, if the speed is to be displayed in the running mode image, the data relating to the speed are sequentially written into the memory 40 as a data history. Thus, the data history can be displayed on the display device as will be described later.

Figure 8:
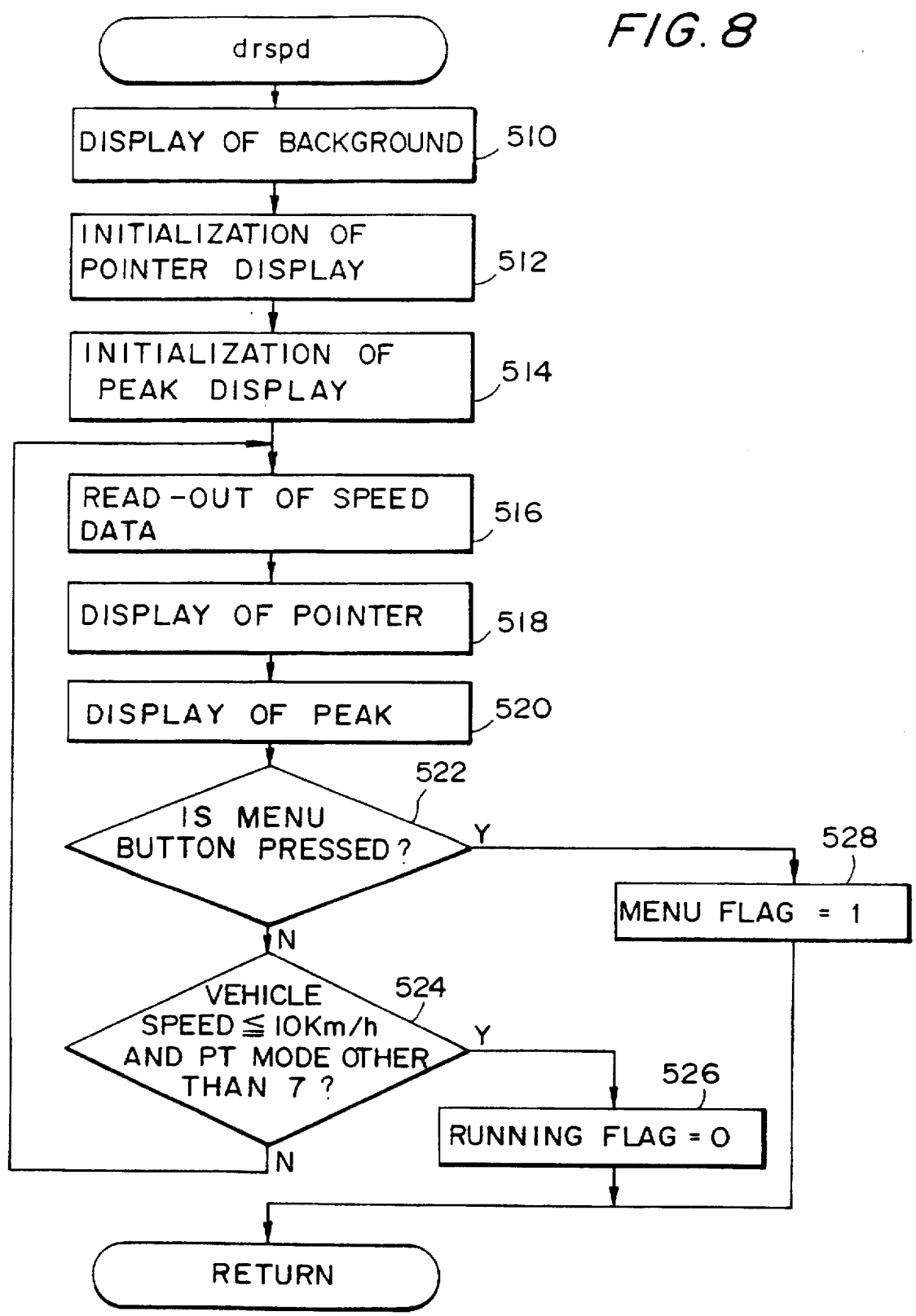
FIG. 8 is a flow chart illustrating the speedometer display.

FIG. 8 shows a flow chart illustrating the detailed operation (step 420) for a display of a speedometer in the running mode.

In such a case, the background image (part with no motion or with less motion) of FIG. 11 is first displayed at step 510. The pointer of the speedometer and peak speed displays are then initialized at steps 512 and 514.

Subsequently, the speed data is read out at step 516 and the pointer of the speedometer corresponding to the foreground image (part with motion) is displayed in real time at step 518. At the same time, the peak speed is displayed on the display device at step 520.

Thus, the speed and its peak can be displayed on the display device in real time, as shown in FIG. 11.

Such a display of running mode image is continued during the period that it is determined at step 524 that the vehicle is in the running mode. At step 524, when the speed of the vehicle is equal to or lower less than 10 Km/Hour and the PT mode flag is any value other than 7, it is determined that the vehicle is in the stop mode. Otherwise, it is determined that the vehicle is in the running mode.

If it is determined at step 524 that the vehicle is switched from the running mode to the stop mode, the program proceeds to step 526 and sets the running flag to "0" and the display of the running mode image is terminated.

If the menu button 23 of the remote control unit 20 is operated when the running mode image is displayed (step 522), the program proceeds to step 528 at which the menu flag is set "1" and such a display of the menu image as shown in FIG. 10(A) will be made.

Although the running mode images of the other items are displayed substantially in the same manner, only the running mode image of "eco" (fuel consumption) item is different from the other running mode images in that the peak value displayed at step 520 is replaced by an average value.

Figure 7:
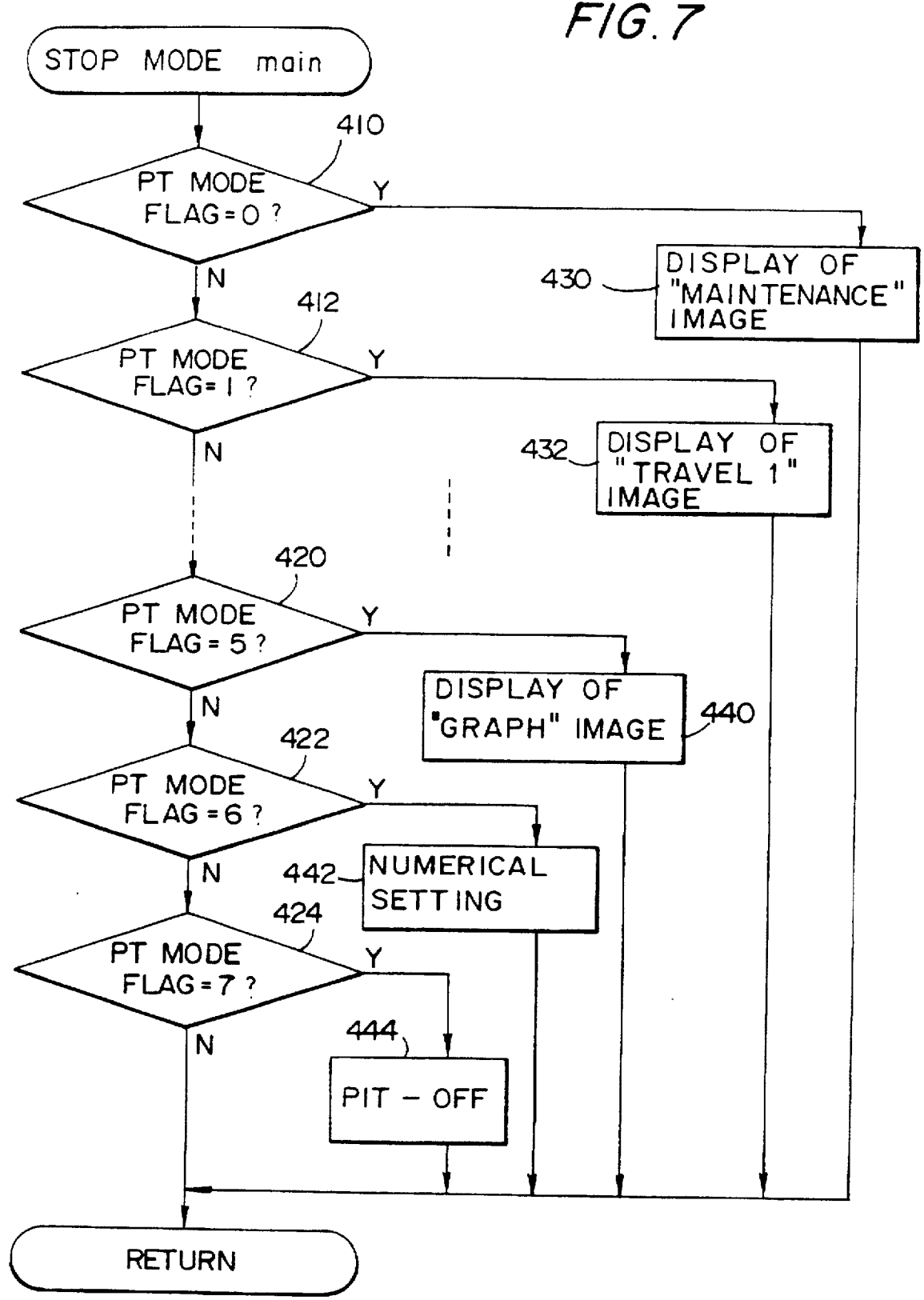
FIG. 7 is a flow chart illustrating the stop mode image display.

FIG. 7 shows a flow chart of the display of such a stop mode image display representing the item selected at step 108 in FIG. 4.

When this stop mode image is to be displayed, it is first determined from the value of the PT mode flag at steps 410, 412 ... 424 which item is selected from the menu image shown in FIG. 10(B) for pit mode flags 0,1 ... 7, respectively.

At steps 430, 432 ... 444, the stop mode image of the selected item is displayed on the display device, respectively.

For example, if the "mainte" item is selected (pit mode flag=0), a stop mode image as shown in FIG. 17(A) is displayed (step 430). The "mainte" display image is used as a record of the history of maintenance. For example, four factors including engine oil, engine oil filter, tire and free items, a set distance to be traveled can be displayed and a covered distance is indicated by bar graph. Thus, the conditions of the vehicle in the maintenance item can promptly be recognized by the driver.

The details of setting of the distance to be traveled will be described later.

Figure 18:
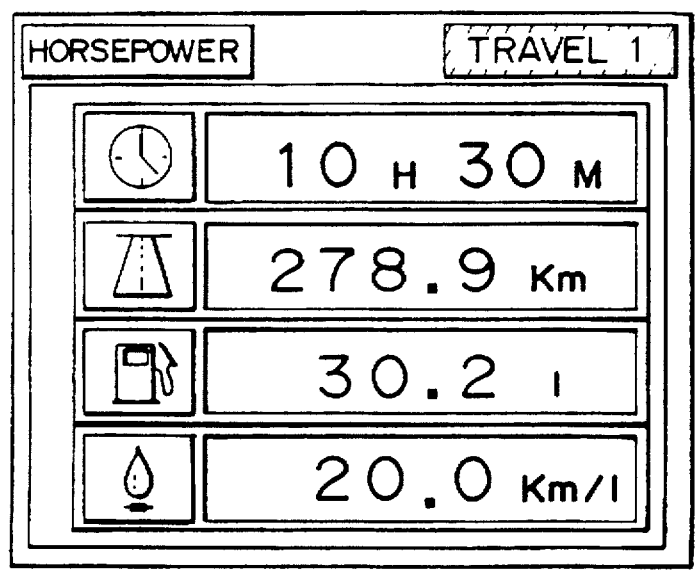
FIG. 18 is a view illustrating "trip" display in a stop mode.

If the "trip" item is selected from the menu image, such a stop mode image as shown in FIG. 18 is displayed (step 432). In this display, time passed from when the reset button 25 of the remote control unit 20 is pressed, covered distance, amount of consumed fuel and average fuel consumption are computed and displayed.

Figure 19A:
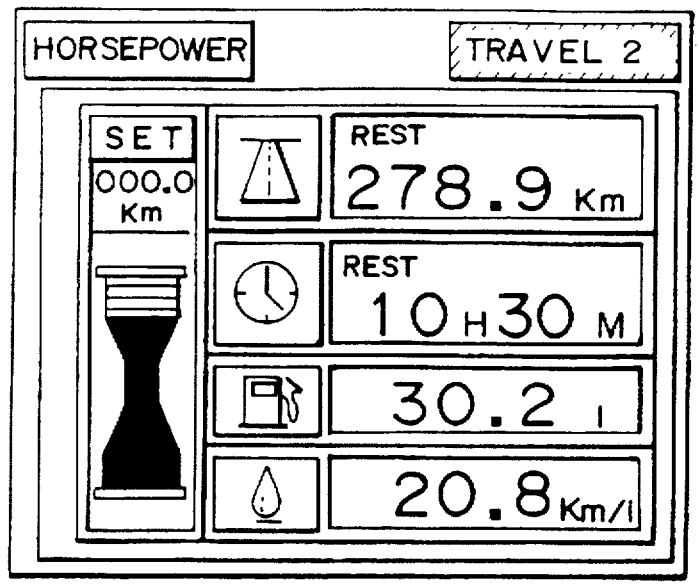
FIG. 19(A) and 19(B) illustrate "travel" display in a running and stop mode.

If the "travel" item is selected from the menu image, such a stop mode image as shown in FIG. 19(A) is displayed (step 434). This indicates the remaining part in the distance set by the driver, time required to travel the remaining distance, expected amount of fuel consumption and expected average fuel consumption. The remaining distance is also displayed in the level meter.

Figure 19B:
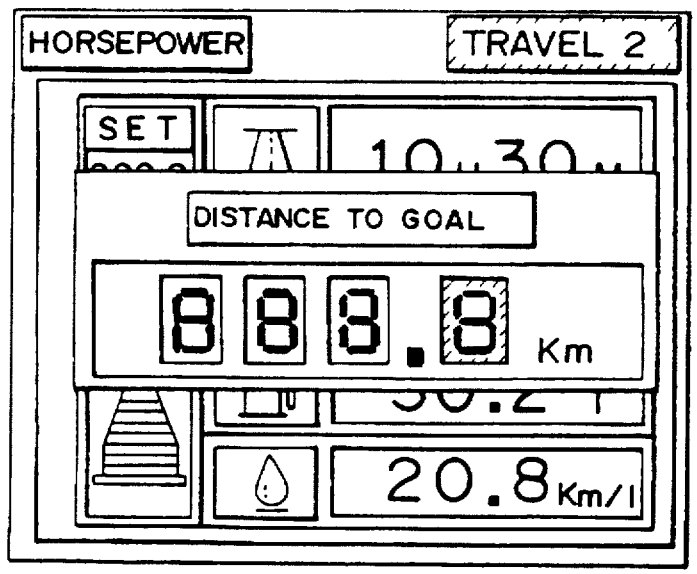

Change of the set distance is performed by opening a window as shown in FIG. 19(B), in the same manner as when the aforementioned menu image is changed.

If the "record" item is selected from the menu image, such a stop mode image as shown in FIG. 20 is displayed (step 436). This image shows, for example, three different past records of distance, time, speed and fuel consumption from the "start" to the "stop" through operation of the button 24 of the remote control unit 20 in the running mode. The past data are sequentially erased and replaced by a new data.

Such a display is effective when a distance from the driver's home to his or her office, time required to travel the distance, speed and fuel consumption are measured through different routes. As a result, the shortest distance from the driver's home to his or her office or the course requiring less time can be objectively determined.

Figure 21A:
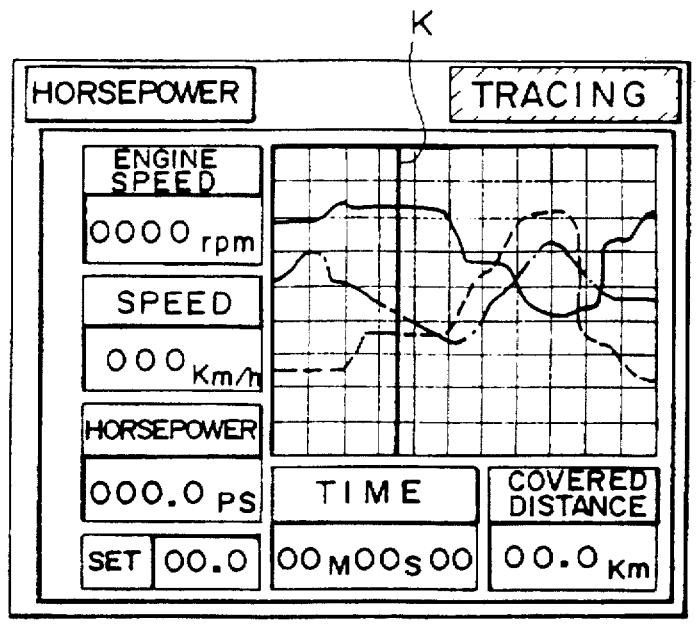
FIG. 21(A) and 21(B) illustrate "trace" display in a running and stop mode.

If the "trace" item is selected from the menu image, a stop mode image as shown in FIG. 21(A) is displayed (step 438). This image indicates measurements of running time, engine speed, speed and power relating to a transverse axis on which preset distances are placed.

Figure 21B:
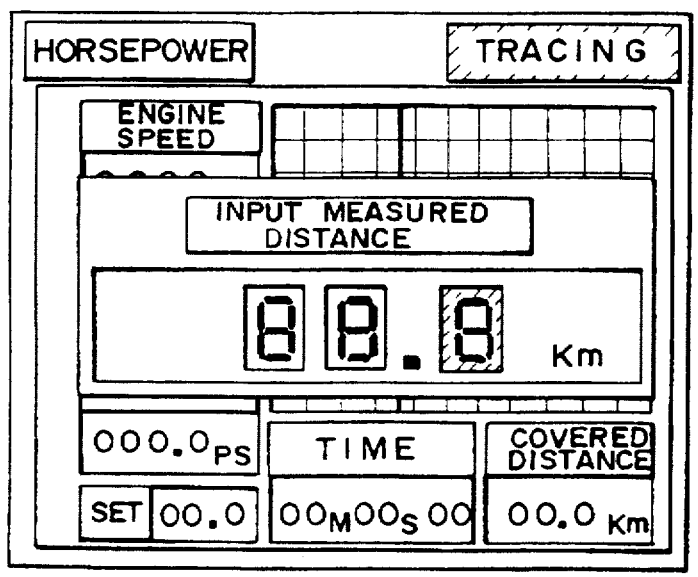

In other words, the set button 28 is pressed at a step in which the image shown in FIG. 21(A) is displayed. Such an input window as shown in FIG. 21(B) is then opened to input measured distances in the same manner as described earlier.

After such a setting has terminated, the vehicle is driven and the start button 24 of the remote control unit 20 is turned on. In connection with a distance from the start to a predetermined place (e.g., 10 Km/Hour), the engine speed, speed, power and required time are sequentially stored in the memory 40.

When the vehicle is switched to the stop mode, the data are read out from the memory 40 and displayed on the display device as such an image as shown in FIG. 21(A). At this time, the driver operates the buttons 26-3 and 26-4 in the remote control unit 20 to move a cursor K in the horizontal direction. Numerical values of the respective data at the position of the cursor K are indicated on the corresponding display position. Thus, the driver can view such displayed data to analyze the running course.

Figure 22:
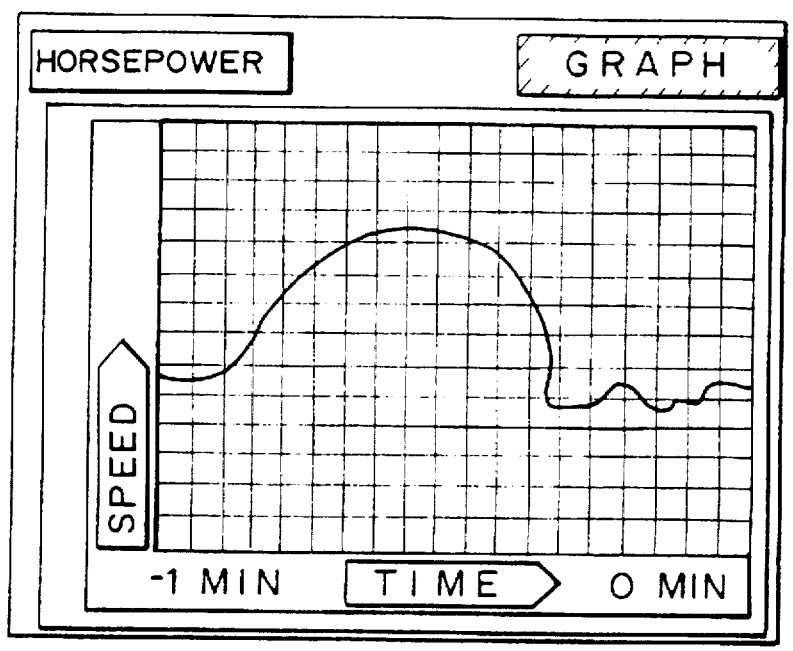
FIG. 22 is a view illustrating "graph" display in a stop mode.

If the "graph" item is selected from the menu image, a stop mode image as shown in FIG. 22 is displayed (step 440). At the same time when the vehicle is switched from the running mode to the stop mode, the data history of the data displayed in the running mode (e.g., data history of speed) are read out from the memory 40 and graphically displayed on the display device as shown in FIG. 22. In other words, at a point of time when the running mode is switched to the stop mode, the past variations of the speed for several minutes are graphically displayed on the display device. Since the variations of the data displayed in real time in the running mode are graphically indicated as a data history, the driver can promptly determine the past history of the data from the displayed image.

Figure 25A:
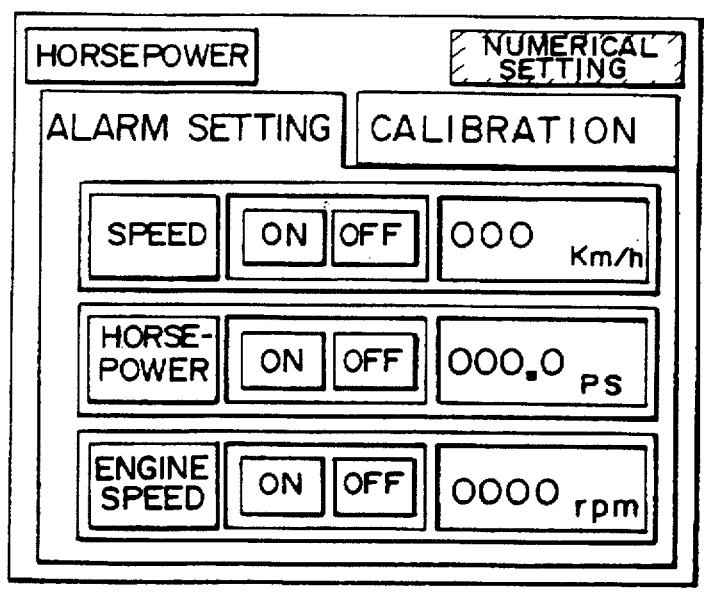
FIG. 25(A) and 25(B) illustrate the input and display images of warning value.

If the "set up" item is selected from the menu image, a stop mode image as shown in FIG. 25(A) is displayed (step 442). Thus, the system of this embodiment includes means for setting a warning value relating to at least one item of one of the running and stop mode images and for outputting a warning signal as the value of the selected item for which the warning value is set reaches the warning value. For example, warning values can be set for items of "speed", "power" and "tacho".

When each of the warning values is to be set, the set button 28 is operated to display a menu image as shown in FIG. 25(A) on the display device.

The buttons 26-1 and 26-2 are then used to select an item for setting a warning value from the "speed", "power" and "tacho" items. In this figure, the item of "speed" is selected.

The buttons 26-3 and 26-4 are then used to input numerical values for warning a speed. Thereafter, the OK button 26-5 is pressed to terminate the setting of alarm.

Figure 25B:
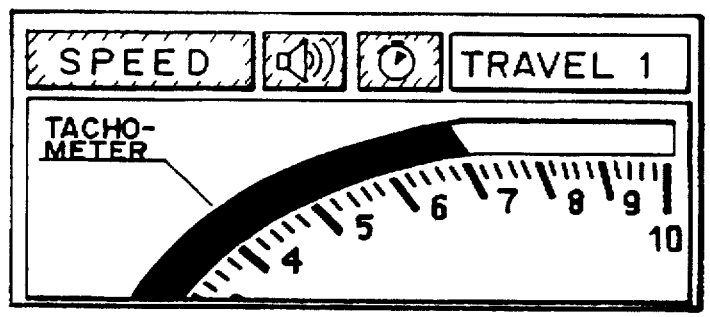

When the vehicle is in the running mode, the running data processing circuit 30 intermittently displays an alarm image on the display device as shown in FIG. 25(B), with a warning sound when the alarm setting item (e.g., "speed" item) reaches the warning value. The driver can promptly know that the speed reaches the warning level, from the alarm display and warning sound. This can prevent the vehicle from being driven greater than the speed limit.

Similarly, the warning displays of "tacho", "power" and so on can be set to prevent the overrunning of the engine, the overoutput of the power and so on.

As described, in the stop mode, the details of the vehicle information can be displayed on the display device as stop mode images such that the driver can know the detailed factors of the vehicle information from the stop mode images.

As shown in FIGS. 17A–22, particularly, the stop mode images indicate smaller characters included therein than those of the running mode images so that the more detailed vehicle information can be transmitted to the driver.

Figure 9B:
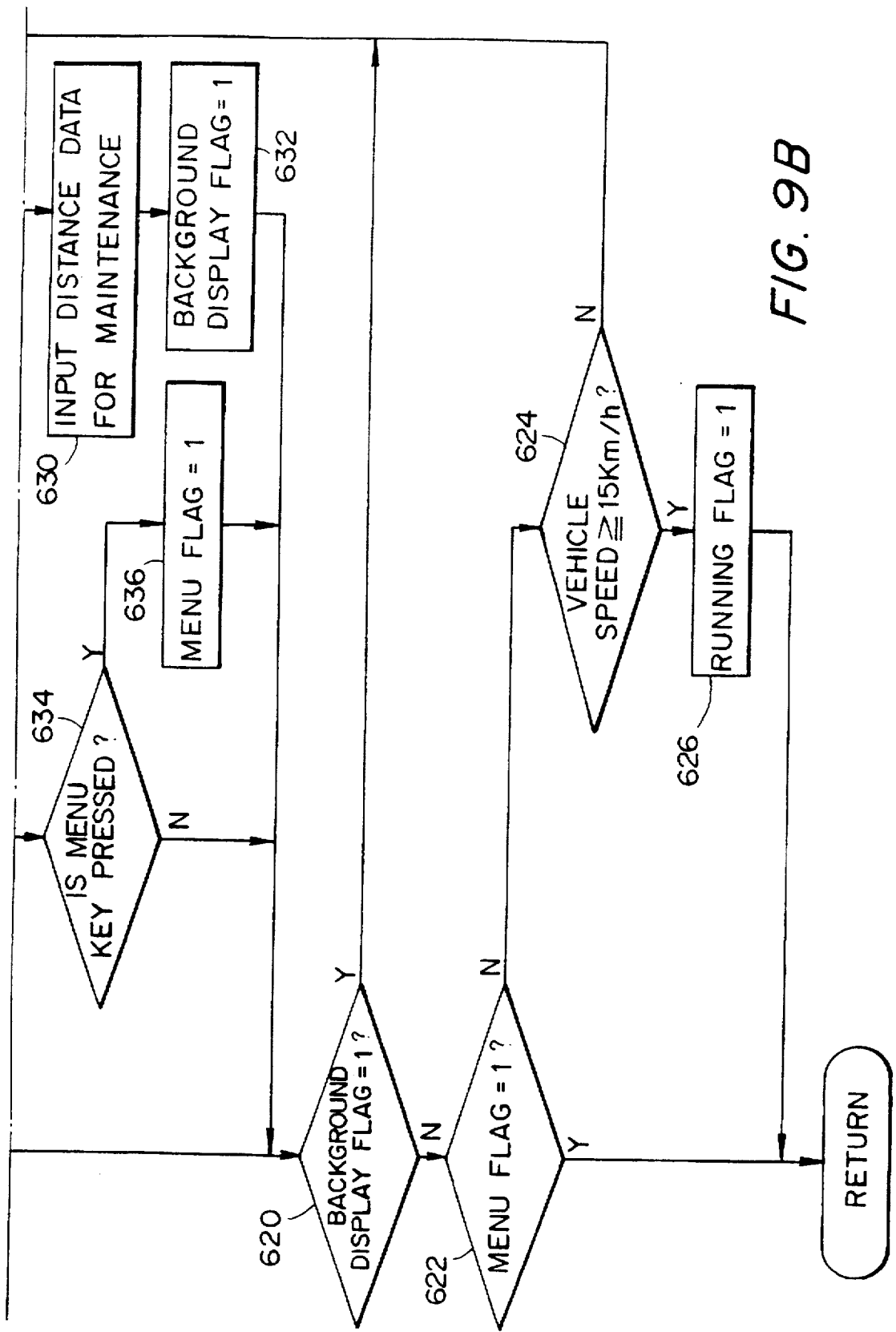
FIG. 9 is a flow chart illustrating the display of "mainte" item.

FIG. 9 shows a flow chart illustrating the details of display operation for the "mainte" item (step 420) of FIG. 7.

First, a background display flag is set "1" at step 610. The program then proceeds through step 612 to step 614. At step 614, the background display flag is again set "0". The background is displayed at step 616. If no key is operated at this time, the program proceeds through steps 618, 620 and 622 to step 624. At step 624, it is determined whether the speed of the vehicle is equal to or higher than 15 Km/Hour. If the speed of the vehicle does not exceed 15 Km/Hour, it is determined that the stop mode continues. The program returns to step 612 wherein a "mainte" display image as shown in FIG. 17(A) continues to be displayed.

As the speed of the vehicle exceeds 15 Km/Hour, it is determined at step 624 that the vehicle has been switched from the stop mode to the running mode. At step 626, the running flag is set "1" and the running mode image of the item selected at present begins to be displayed.

In this embodiment, it is seen that the stop mode is switched to the running mode at 15 Km/Hour. As shown by step 524 in FIG. 8, it is further seen that the running mode is switched to the stop mode at 10 Km/Hour. In such a manner, a reference speed at which the vehicle is switched from the stop mode to the running mode is higher than another reference speed at which the vehicle is switched from the running mode to the stop mode. Thus, when the vehicle is repeatedly stopped and started in a traffic jam or when the vehicle is driven at a low speed, the stop and running mode images can be prevented from being frequently switched from one mode to another mode to provide stable images on the display device.

Figure 17B:
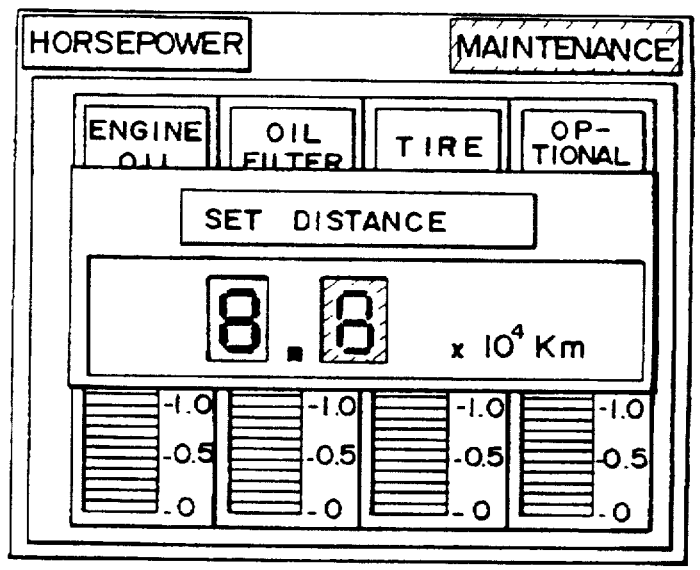

If such an image as shown in FIG. 17(A) is displayed and when it is wanted to change the set distance (20,000 Kilometers in FIG. 17), the set button 27 of the remote control unit 20 is pressed. Thus, the program proceeds from step 618 to step 628 wherein distance data for maintenance begin to be input at step 630. In such a case, four items of engine oil, filter, tire and freedom are independently set with respect to their distances. For example, when the set button 27 is operated, any one of the four items can be selected. After the selection of item, the OK button 26-5 is then operated to open such a window as shown in FIG. 17(B). The buttons 26-1 to 26-4 in the remote control unit 20 are then operated to input and set a desired distance. Finally, the OK button 26-5 is operated to complete the input operation and to close the window, the display being returned back to the image of FIG. 17(A).

When the series of distance data inputs (step 630) is terminated, the background flag is set "1" at step 632. The program then proceeds from step 620 to step 612 wherein the "mainte" image is displayed in the same manner as described above.

When the driver wants to change the displayed items in the stop mode, the menu button 23 of the remote control unit 20 is operated. Thus, the program proceeds through steps 618 and 628 to step 634. At step 636, the menu flag is set "1". The program then proceeds to the selection of menu images shown in FIG. 5 through steps 620 and 622. Thus, a desired item can be selected.

The display of the respective stop mode images shown in FIGS. 18–21B and the rewriting of set values are basically similar to those of the "mainte" image shown in FIGS. 17A and B and will not further described herein.

Figure 23:
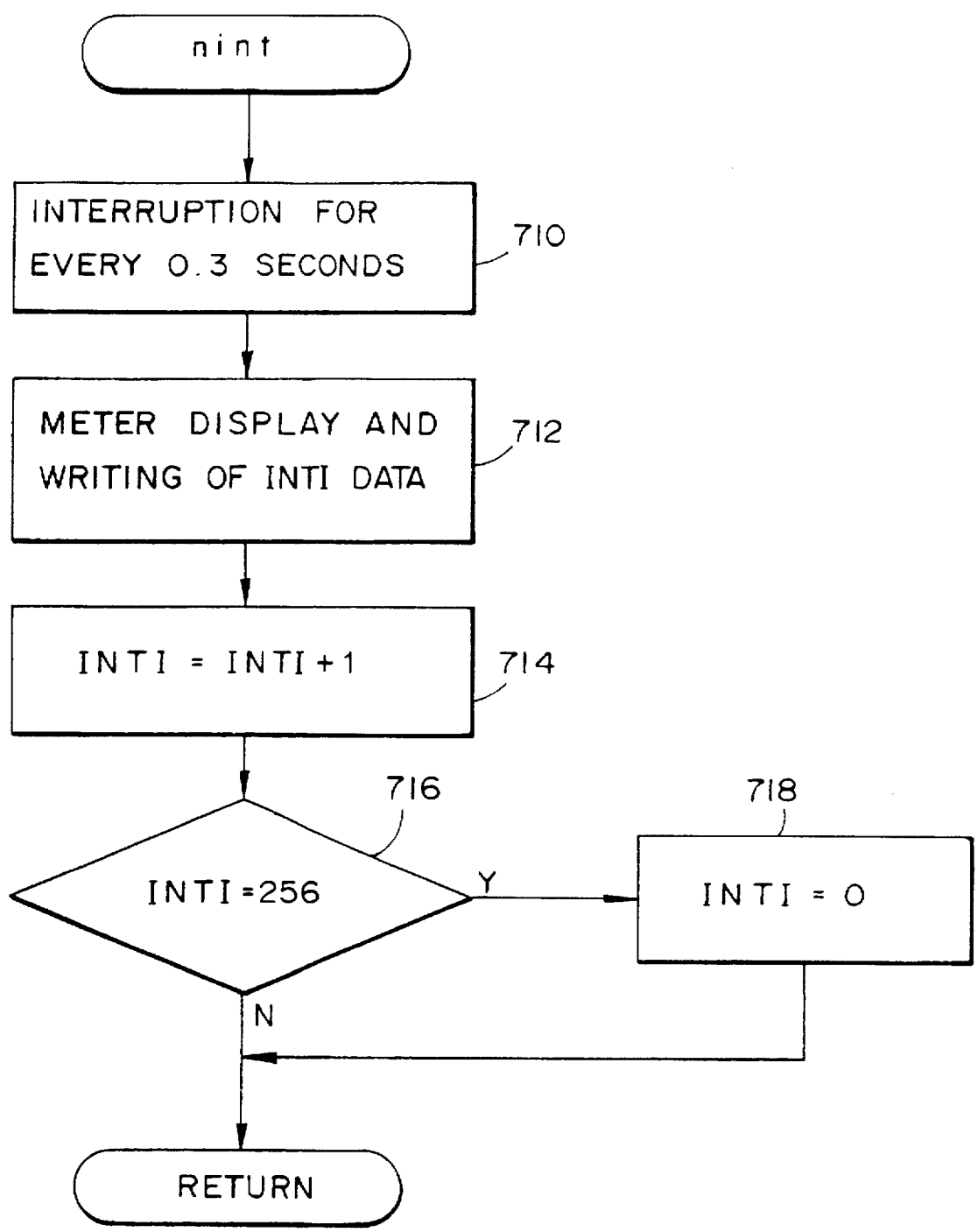
FIG. 23 is a flow chart illustrating the accumulation of the data history.
Figure 24:
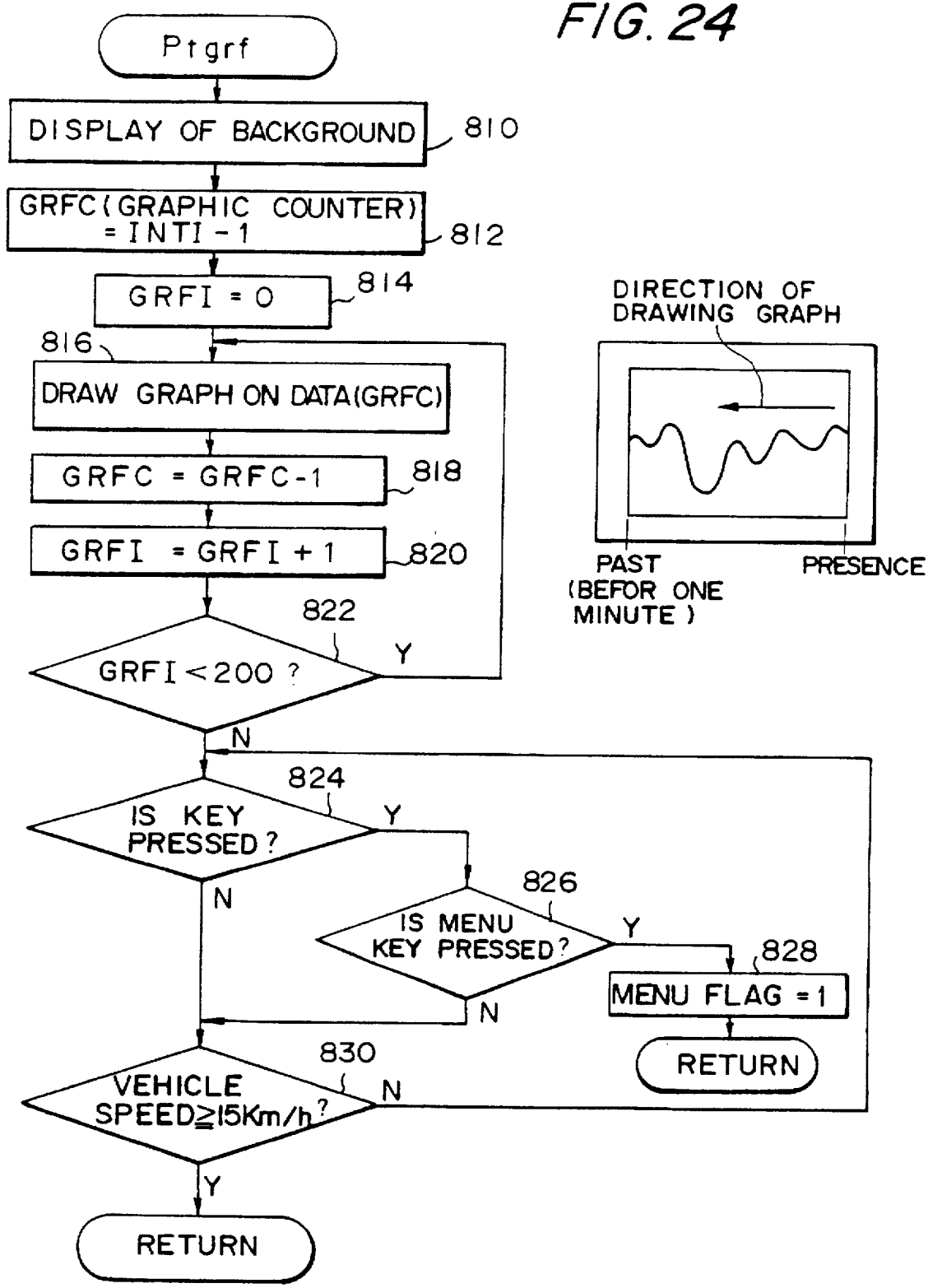
FIG. 24 is a flow chart illustrating the graphic display operation of the data history.

FIG. 23 shows a flow chart illustrating the writing of a data history into the memory 40 for a graph display shown in FIG. 22 in the running mode. FIG. 24 shows a flow chart illustrating the details of display operation for the graph on the display device using the written data history.

In the running mode, for example, assuming that the item "speed" is selected, an interruption program to the main program is periodically executed every 0.3 seconds at step 710 of FIG. 23. At step 712, the speed data being displayed in the running mode image is read into the memory 40 at an address specified by INTI. The address INTI is then increased by one (step 714).

As the value of INTI reaches 256, the program proceeds from step 716 to step 718 wherein the INTI value is set "0".

For every 0.3 seconds, the speed data read are sequentially stored in the memory. Thus, the last 256 speed data read will always be written in the memory 40 at addresses 0-255.

FIG. 24 shows a display operation of a graph using the history data written into the memory 40 on the display device. At step 810, such a background image as shown in FIG. 22 is displayed. At step 812, a value of a read address GRFC is set at an address (INTI-1) which has been specified to be the last address written into the memory 40.

At step 814, a graphic counter GRFI is set "0". At step 816, the data of address GRFC is then read out from the memory 40 and graphically displayed on the display device.

At step 818, the read address GRFC is decreased by one. At step 820, the graphic counter GRFI is increased by one.

Such a counting operation is repeatedly executed until the count of the graphic counter GRFI, for example, reaches 200 (step 822), and the data history such as speed and so on are graphically displayed on the display device, as shown in FIG. 22. The menu flag setting at steps 824–828 as well as the stop mode determination at step 830 are similar to those of FIG. 9 and will not further be described herein.

The difference between the graph of data history shown in FIG. 22 and the graph shown in FIG. 21A resides in that the horizontal axis in the graph of FIG. 22 is set with reference to time while the horizontal axis in the graph of FIG. 21A is set with reference to distance.

The graph shown in FIG. 22 can be made to display the data history for one minute or several minutes in the past.

Therefore, the driver can visually and promptly grasp the variations of speed from one minute to several minutes in the past. Based on such data, the driver can try to improve his or her own driving technique.

The present invention is not limited to the aforementioned embodiment thereof, and various modification can be made within the scope of the invention.

As described, the on-vehicle data processing system of the present invention can indicate on the display device the running mode images with large characters more easily viewed by the driver while in the running mode and the stop mode images with smaller characters to display the details of the vehicle information while in the stop mode. Thus, the driver can obtain various information from the on-vehicle display device and effectively use the on-vehicle display device.

What is claimed is:

1. An on-vehicle data processing system that processes data while an engine is running based on a present-speed of a vehicle detected by a detector, comprising:

mode setting means responsive to the present speed of the vehicle for selecting and setting one of running and stop modes, the stop mode being active while the engine is running;

display data processing means for computing running mode images indicating running states of the vehicle when the running mode is selected and set and for computing stop mode images indicating various vehicle information when the stop mode is selected and set; and an on-vehicle display device for displaying the running or stop mode image computed by said display data processing means.

2. An on-vehicle data processing system as defined in claim 1, further comprising control means for selecting any one of items for a running or stop mode image, wherein said display data processing means computes the running or stop mode image representing a selected item.

3. An on-vehicle data processing system as defined in claim 2 wherein said control means is operative to set a warning value relative to at least one of the running and stop mode images and wherein said display data processing means is operative to output a warning signal when a level of selected item set by the warning value reaches the warning value.

4. An on-vehicle data processing system as defined in claim 1 wherein said display data processing means is operative to display larger characters in the running mode images and smaller characters in the stop mode images.

5. An on-vehicle data processing system that processes data while an engine is running based on a present-speed of a vehicle detected by a detector, comprising:

mode setting means responsive to the present speed of the vehicle for selecting and setting one of running and stop modes;

display data processing means for computing running mode images indicating running states of the vehicle when the running mode is selected and set and for computing stop mode images indicating various vehicle information when the stop mode is selected and set;

an on-vehicle display device for displaying the running or stop mode image computed by said display data processing means;

control means for selecting any one of items for a running or stop mode image, wherein said display data processing means computes the running or stop mode image represented a selected item; and memory means for storing history of data of an item selected for the running mode image as a data history, said control means being capable of selecting the data history as an item for the stop mode image, said display data processing means being operative to read said data history from said memory means and to compute the stop mode image for a graphical display when data history item is selected in the stop mode, wherein in the running mode, data of selected item are displayed in real time and in the stop mode, the data history is displayed in a graph to indicate variations of the data.

6. An on-vehicle data processing system that processes data while an engine is running based on a present-speed of a vehicle detected by a detector, comprising:

mode setting means responsive to the present speed of the vehicle for selecting and setting one of running and stop modes;

display data processing means for computing running mode images indicating running states of the vehicle when the running mode is selected and set and for computing stop mode images indicating various vehicle information when the stop mode is selected and set; and an on-vehicle display device for displaying the running or stop mode images computed by said display data processing means, wherein said mode setting means sets a first reference speed at which the running mode is switched to the stop mode and sets a second reference speed at which the stop mode is switched to the running mode, and wherein the first reference speed is lower than the second reference speed.

7. An on-vehicle data processing system that processes data while an engine is running based on a present-speed of a vehicle detected by a detector, comprising:

mode setting means responsive to the present speed of the vehicle for selecting and setting one of running and stop modes;

display data processing means for computing running mode images indicating running states of the vehicle when the running mode is selected and set and for computing stop mode images indicating various vehicle information when the stop mode is selected and set;

an on-vehicle display device for displaying the running or stop mode image computed by said display data processing means; and said display data processing means is operative to compute images for daytime with the foreground being brighter than the background and to compute images for night with the foreground being darker than the background.

8. An on-vehicle data displaying system that processes data while an engine is running, comprising:

sensing means for sensing one of a running state and a stop state of a vehicle, the stop state being active while the engine is running;

computation means for computing on-vehicle data which corresponds to one of the running state and the stop state of the vehicle based on a current state of the vehicle sensed by said sensing means; and on-vehicle data display means for displaying the on-vehicle data computed by said computation means, wherein said on-vehicle data display means displays running mode images when said sensing means senses the running state and displays stop mode images when said sensing means senses the stop state.

9. The on-vehicle data displaying system as defined in claim 8, wherein said on-vehicle data display means is mounted on a vehicle dashboard and displays one of a television broadcast, a navigation system and on-vehicle data.

10. The on-vehicle data displaying system as defined in claim 9, wherein said on-vehicle data display means is mounted separately from an instrument panel.

11. The on-vehicle data displaying system as defined in claim 9, further comprising display data processing means for selecting from one of daytime mode and nighttime mode and processing the on-vehicle data for display in accordance with the selected mode.

12. An on-vehicle data processing system, comprising:

on-vehicle data display means;

means for sensing a driving speed of a vehicle, wherein said on-vehicle data display means displays on-vehicle data of a first information type when said driving speed is greater than a predetermined driving speed and displays on-vehicle data of a second information type when said driving speed is less than said predetermined driving speed while an engine is running, and wherein the first information type is displayed using elements larger than said second information type.

13. An on-vehicle data processing system, comprising:

on-vehicle data display means;

means for sensing a driving speed of a vehicle, wherein said on-vehicle data display means displays on-vehicle data of a first information type when said driving speed is greater than a predetermined driving speed and displays on-vehicle data of a second information type when said driving speed is less than said predetermined driving speed while an engine is running, and wherein the first information type content is less than the second information type content.

14. An on-vehicle display device for displaying one of a television broadcast, a navigation system and output from an on-vehicle data computation device, the on-vehicle data computation device comprising:

means for sensing a driving speed of a vehicle, wherein said on-vehicle display device displays on-vehicle data of a first information type when said driving speed is above a predetermined driving speed and displays on-vehicle data of a second information type when said driving speed is below said predetermined driving speed while an engine is running, and wherein the first information type is displayed using elements larger than the second information type.

15. An on-vehicle display device for displaying one of a television broadcast, a navigation system and output from an on-vehicle data computation device, the on-vehicle data computation device comprising:

means for sensing a driving speed of a vehicle, wherein said on-vehicle display device displays on-vehicle data of a first information type when said driving speed is above a predetermined driving speed and displays on-vehicle data of a second information type when said driving speed is below said predetermined driving speed while an engine is running, and wherein the first information type content is less than the second information type content.

16. An on-vehicle data processing system that processes data while an engine is running based on at present-speed of a vehicle detected by a detector, comprising:

mode setting means responsive to the present speed of the vehicle for selecting and setting one of running and stop modes, the stop mode being active while the engine is running;

display data processing means for computing running mode images indicating running states of the vehicle when the running mode is selected and set and for computing stop mode images indicating various vehicle information when the stop mode is selected and set;

an on-vehicle display device for displaying the running or stop mode image computed by said display data processing means, wherein the mode setting means provides a hysteresis characteristic to change between the running and the stop modes.

* * * * *